No. 802,097. PATENTED OCT. 17, 1905.
N. P. FENNER, Jr.
WATER METER.
APPLICATION FILED APR. 22, 1904. RENEWED AUG. 19, 1905.
2 SHEETS—SHEET 2.
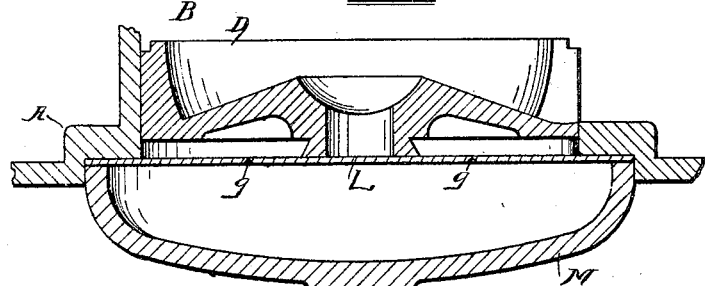
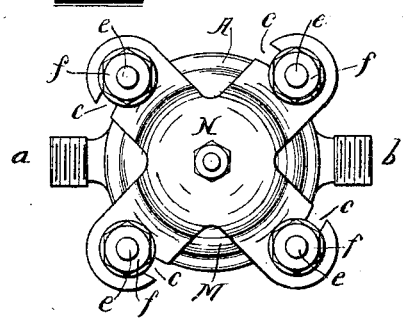
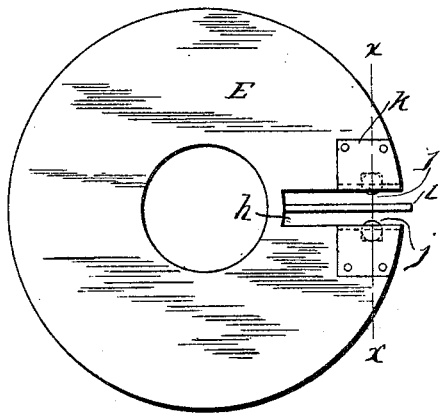
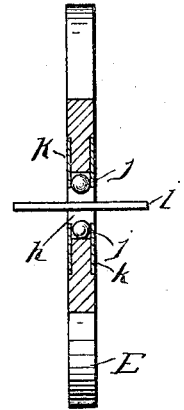
Witnesses.
A. B. Bramble.
Edward Peck
Inventor.
Nicholas Paul Fenner Jr.
by Chas. M. Peck
his Attorney

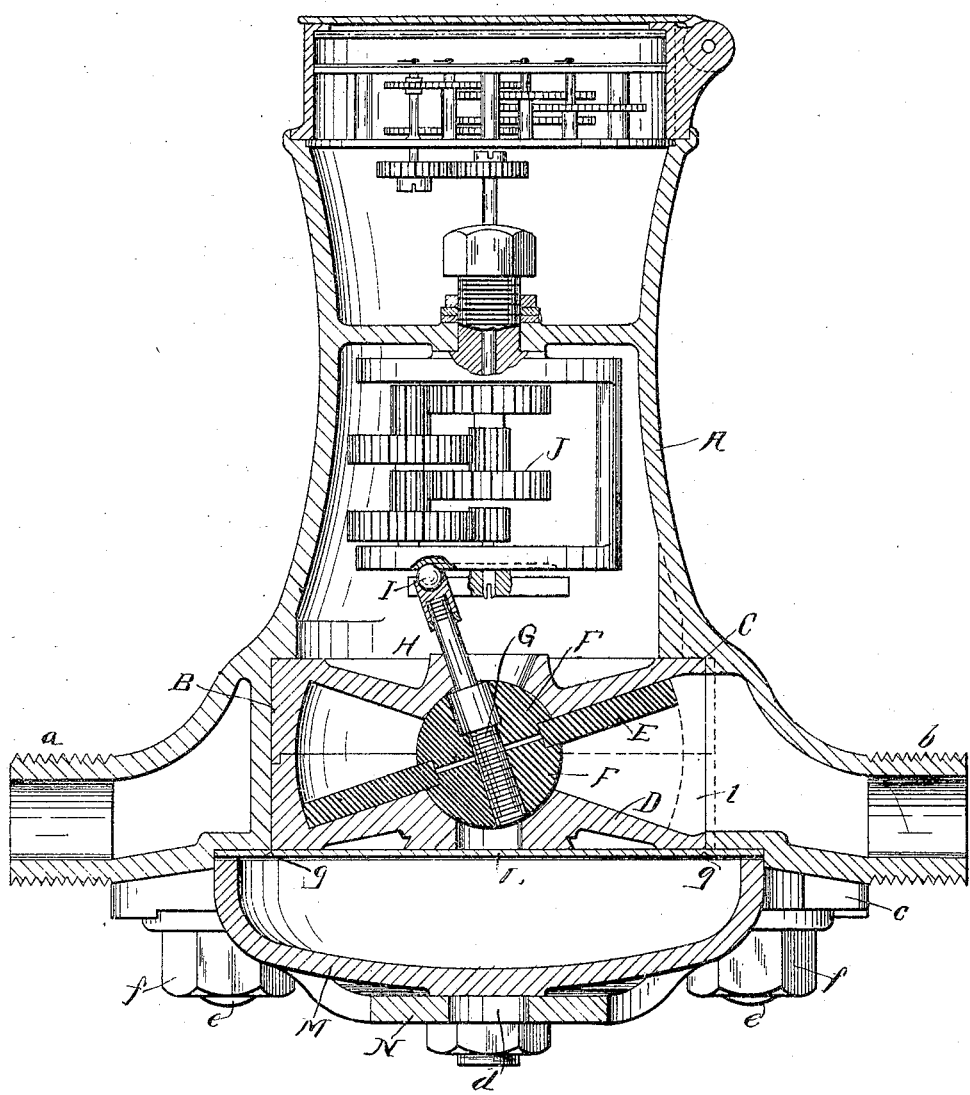

UNITED STATES PATENT OFFICE.

NICHOLAS PAUL FENNER, JR., OF CINCINNATI, OHIO, ASSIGNOR TO THE AMERICAN VALVE & METER COMPANY, OF CINCINNATI, OHIO, A CORPORATION OF WEST VIRGINIA.

WATER-METER.

No. 802,097.  Specification of Letters Patent.  Patented Oct. 17, 1905.

Application filed April 22, 1904. Renewed August 19, 1905. Serial No. 274,966.

*To all whom it may concern:*

Be it known that I, NICHOLAS PAUL FENNER, Jr., a citizen of the United States, residing at Cincinnati, in the county of Hamilton and State of Ohio, have invented certain new and useful Improvements in Water-Meters, of which the following is a full, clear, and exact description, reference being had to the accompanying drawings, forming part of this specification.

My invention relates to that class of water-meters known as "disk" meters and having nutating pistons for measuring the water as it passes through the meter and register mechanisms operated by said pistons for registering the amount of water measured; and it has for its object the improvement of certain parts of the device whereby their construction is simplified and their operation rendered more efficient, all as will be hereinafter more fully set forth, and specifically pointed out in the claims.

In the accompanying drawings, Figure 1, Sheet 1, is a central sectional side elevation of a water-meter embodying my invention. Fig. 2, Sheet 2, is a sectional elevation, partly broken away, showing the diaphragm and lower part of the disk chamber under a modified form of construction. Fig. 3, Sheet 2, is a plan view of the disk. Fig. 4, Sheet 2, is a sectional edge elevation of Fig. 3, taken on the dotted line $x$ $x$. Fig. 5, Sheet 2, is a diminished bottom plan view of the meter-casing, showing the means for retaining the disk chamber and diaphragm in their proper positions.

The same letters of reference are used to indicate identical parts in all the figures.

My meter, like others of its class, has at its lower end the measuring-chamber, containing a nutating piston or disk. Induction and eduction ports are provided, communicating with the measuring-chamber, so that the water passing through actuates the nutating disk, of which there is, first, a train of gearing contained within the water-chamber and then a dial mechanism above the same, outside of the water-chamber, which indicates exactly the amount of water passed through the meter.

Referring now to the drawings, A represents the meter-casing, provided with inlet-port $a$ and outlet-port $b$. These are on opposite sides of the measuring-chamber B. This chamber is composed of two interlocked parts C D in the form of opposing craters, between which the disk is interposed.

The nutating measuring-disk is composed of a disk E, which is clamped between two hemispheres F, the construction of said disk and of said hemispheres being preferably hard rubber. The hemispheres F are united and the disk E clamped between them by a screw-threaded stud G, which has an upwardly-projecting stem upon which is adjustably mounted a sleeve H, in the upper end of which is seated a ball I, which rolls in a circumferential track on the under side of a casing or housing that supports a system of gearing J, customary in this class of meters. This sleeve H bears against a transverse crank-arm K on the lower end of the train of gearing J and communicates to said train of gearing its rotary motion through the movements of the disk E. The ball I in its circumferential track acts as a governor to hold said nutating disk in its proper position at all times and to prevent it from tilting away from the surfaces of the measuring-chamber, which tilting away would either cause the meter to cease registering entirely or would greatly impair its efficiency.

The disk chamber B is held in place by a diaphragm L, which is placed below the disk chamber and bears upwardly against the lower side thereof. This diaphragm L is held in place by the bottom cap M, upon which is mounted the four-arm bracket N, provided with slots $c$ in the ends of the arms. These slots when the bracket N is revolved on its stud $d$ of the cap M engage studs $e$, which are secured to the meter-casing A and provided with nuts $f$ for the purpose of clamping the bracket N and cap M in position, as will be readily understood, and when it becomes necessary to remove the cap M for any purpose it is only necessary to loosen the nuts $f$ on the studs $e$ and revolve the bracket-piece away from said studs, when the cap may be bodily removed from the meter.

Water-meters are frequently placed in such positions that the water within them sometimes freezes in extreme cold weather, and this freezing results in more or less damage to the mechanism of the meter. In order to obviate this difficulty, I place the diaphragm L within the meter to hold the parts in position and prefer to construct it in such manner that it will withstand the ordinary pressure of the water within the meter. I prefer to cut a circumferential groove $g$ on the under side of this diaphragm L, so that should the water within the meter become frozen the great increase of pressure within the measuring-chamber and above the same will force the measuring-chamber downward and separate the two parts thereof and cause the lower part D to punch or break the diaphragm along the line of the circumferential groove $g$, which is the weakest part of the diaphragm, and so relieve the pressure within the meter and the consequent danger of the breakage of the mechanism.

In Fig. 2 the construction of the last described part of my device is shown in a somewhat modified form and consists in exerting the pressure upon the diaphragm at or near the center instead of at or near the edge, as in the before-described construction. This modified construction permits of the use of a heavier diaphragm than that necessitated by the construction shown in Fig. 1 by reason of the fact that the pressure, while being the same in both instances, is more localized in the construction shown in Fig. 2, and in this construction the central part of the disk chamber, which bears against the diaphragm, may break through the same and so give an increased area for the water within the meter without allowing the mechanism to drop so far out of the way as it will drop in the construction shown in Fig. 2, as will be readily understood.

While I prefer to construct the diaphragms of cast-iron and grooved, as described, so that they may break under excess of pressure, it is obvious that they may be constructed of metals which will not break, but which collapse or buckle when the pressure within the meter rises above that which the meter is intended to withstand.

Referring now to the construction of the disk, as has been described, it is made of two hemispherical portions F, embracing and clamping the disk proper, E, and is constructed in this manner for facilitation in production, as it is much easier to form the hemispherical portions F separately and also much cheaper than it is to turn down the disk and the two hemispheres from one piece of solid rubber. The disk E is slotted, as at $h$, Figs. 3 and 4, to embrace the partition $i$, usual in disk meters, interposed between the two portions C D of the measuring-chamber B and separating the inlet from the outlet port of the measuring-chamber. At the outer end of the slot $h$ in the disk E and on both sides thereof I provide antifriction-balls $j$, which are partially incased by thin metal housings $k$, recessed into the sides of the disk E, as will be readily understood. These balls $j$ are interposed for the purpose of preventing the edges of the disk from coming in contact with the partition $i$, which would result in friction and a liability of breakage to the disk when the meter was running at a high speed or was suddenly stopped.

The parts of the meter which I have not described in detail are common to meters of this class and are well known generally and need no further description, as my present invention is not concerned therewith.

Having thus fully described my invention, I claim—

1. In a water-meter of the character described, the combination with a meter-casing, of a two-part measuring-chamber located within the same and communicating with inlet and outlet ports therein, a measuring-disk located within said measuring-chamber, registering mechanism connected to said measuring-disk, a breakable diaphragm for retaining the parts in operating position, and a water-tight retaining-cap for supporting the diaphragm and inclosed parts in case of breakage without the escape of water, substantially as described.

2. In a water-meter of the character described, the combination with a meter-casing, of a water-tight retaining-cap removably secured to the bottom thereof, a two-part measuring-chamber located within said meter-casing and communicating with inlet and outlet ports therein, a three-part measuring-disk located within said measuring-chamber, registering mechanism connected to said measuring-disk, and a diaphragm interposed between said water-tight retaining-cap and said measuring-chamber, substantially as described.

3. In a water-meter, the combination with a meter-casing, of a water-tight retaining-cap removably secured to the bottom thereof, a measuring-chamber located within said meter-casing and communicating with inlet and outlet ports therein, a measuring-disk located within said measuring-chamber, registering mechanism connected to said measuring-disk, and a breakable or collapsible diaphragm with a frangible periphery near its clamping edge interposed between said retaining-cap and said measuring-chamber, as and for the purpose specified.

NICHOLAS PAUL FENNER, Jr.

Witnesses:
EDWARD PECK,
EDWARD SUSSDORF.